(12) United States Patent
Muraki et al.

(10) Patent No.: US 10,549,507 B2
(45) Date of Patent: Feb. 4, 2020

(54) LAMINATE SHEET AND PACKAGING CONTAINER SLEEVE

(71) Applicant: TOPPAN PRINTING CO., LTD., Tokyo (JP)

(72) Inventors: Kentaro Muraki, Tokyo (JP); Yasuhide Ito, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/021,798

(22) Filed: Jun. 28, 2018

(65) Prior Publication Data

US 2018/0304587 A1 Oct. 25, 2018

Related U.S. Application Data

(63) Continuation of application No. PCT/JP2017/002555, filed on Jan. 25, 2017.

(30) Foreign Application Priority Data

| Feb. 3, 2016 | (JP) | ................................. 2016-018874 |
| Feb. 9, 2016 | (JP) | ................................. 2016-022458 |
| Feb. 24, 2016 | (JP) | ................................. 2016-033216 |

(51) Int. Cl.
  *B65D 5/42* (2006.01)
  *B32B 15/12* (2006.01)
  *B65D 65/40* (2006.01)

(52) U.S. Cl.
  CPC ................ *B32B 15/12* (2013.01); *B65D 5/42* (2013.01); *B65D 65/40* (2013.01)

(58) Field of Classification Search
  CPC . B65D 5/42; B65D 65/40; B65D 3/22; B65D 2577/2025; B32B 15/12;

(Continued)

(56) References Cited

U.S. PATENT DOCUMENTS 4,838,432 A * 6/1989 DePaul ................ B65D 5/5435
  229/145
5,078,313 A * 1/1992 Matheson ........... B05B 13/0609
  118/314

(Continued)

FOREIGN PATENT DOCUMENTS

| JP | H03-75129 U | 7/1991 |
| JP | H04-109017 U | 9/1992 |

(Continued)

OTHER PUBLICATIONS

International Search Report with English language translation and Written Opinion issued in International Application No. PCT/JP2017/002555 dated Mar. 21, 2017.

*Primary Examiner* — Christopher R Demeree
(74) *Attorney, Agent, or Firm* — Foley & Lardner LLP

(57) ABSTRACT

A laminate sheet for a packaging container having a top and a bottom each formed by folding and heat sealing a region including an end portion of a tubular body, formed by overlapping and heat sealing two side edges of a sheet material, the laminate sheet comprising: a top seal section corresponding to the top; a bottom seal section corresponding to the bottom; and a side face section, which is a region sandwiched by the top seal section and the bottom seal section, and including: an inner layer film with a water vapor barrier layer and a sealant layer; a paper substrate; and a thermoplastic resin layer, in sequence from inside the packaging container, wherein a glossy layer is disposed between the paper substrate and the thermoplastic resin layer except for at least part of a region included in the top seal section or the bottom seal section.

15 Claims, 7 Drawing Sheets

(58) Field of Classification Search
CPC . B32B 27/08; B32B 2439/70; B32B 2307/31; B32B 37/06; B32B 37/065; B32B 37/1207; B32B 37/203; B29C 66/0242; B29K 2077/00; B29K 2023/12; D21H 25/06; B31B 2170/20; B31B 70/64; B65B 2051/105; B65B 7/164; C09J 5/06
USPC .......... 229/122.1, 132, 134, 406; 156/308.2, 156/308.6, 309.9, 244.25, 244.27, 307.3, 156/313, 322, 324.4, 325, 60, 85; 428/483, 156, 172, 36.91; 493/133; 53/463; 118/665; 206/524.3; 264/211.12; 427/379; 521/143
See application file for complete search history.

(56) References Cited

U.S. PATENT DOCUMENTS

| | | | | |
|---|---|---|---|---|
| 5,143,281 | A * | 9/1992 | Mainz .................... | B65D 5/061 229/132 |
| 6,601,757 | B2 * | 8/2003 | Bowman ................ | B65D 5/425 229/116.5 |
| 7,905,388 | B2 * | 3/2011 | Bowman .............. | B65D 5/4262 229/116.5 |

FOREIGN PATENT DOCUMENTS

| | | |
|---|---|---|
| JP | H11-334756 A | 12/1999 |
| JP | 2002-370307 A | 12/2002 |
| JP | 2010-052761 A | 3/2010 |
| JP | 2013-203454 A | 10/2013 |

* cited by examiner

LAMINATE SHEET AND PACKAGING CONTAINER SLEEVE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/002555, filed on Jan. 25, 2017, which is based upon and claims the benefit of priority to Japanese Patent Application Nos. 2016-018874, filed on Feb. 3, 2016, 2016-022458, filed on Feb. 9, 2016, and 2016-033216, filed on Feb. 24, 2016. The disclosures of which are all hereby incorporated herein by reference in their entireties.

BACKGROUND

Technical Field

The present invention relates to a laminate sheet for a packaging container having a highly metallic glossy surface and excellent preservation properties for the contents, and a packaging container sleeve using the same.

Background Art

In recent years, paper containers having high preservation properties for the contents have been widely used. Paper containers are mainly made from wood pulp, which is reusable, and can be recycled as raw materials for paper manufacturing after use. Therefore, with increasing awareness for global environment conservation, paper containers have been evaluated as global eco-friendly containers compared with bottles, cans, plastic containers and the like.

However, paper containers have disadvantages in that they are less sophisticated in terms of designability compared with bottles, cans, plastic containers, and the like. As one technique to overcome the above disadvantages, various paper containers having a surface to which a metallic gloss is imparted have been proposed.

PTL 1 discloses a paper container made of a laminate sheet composed of an inner layer film having a gas barrier layer containing a metal oxide vapor deposition layer and a sealant layer, a paper substrate, and a thin paper having a light shielding layer on its rear surface and a metal vapor deposition layer on its front surface, which are laminated by an adhesive resin, and a thermoplastic resin layer provided as an outermost layer.

PTLs 2 and 3 disclose a paper container which uses a metal vapor deposition film layer on the outer surface of the paper layer to thereby exhibit a high metallic gloss.

CITATION LIST

[Patent Literature] [PTL 1] JP-2010-52761 A; [PTL 2] JP-H11-334756 A; [PTL 3] JP-2002-370307 A

SUMMARY OF THE INVENTION

Technical Problem

In order to provide paper containers with long-term storage properties for the contents, a layer having gas barrier properties is required to be provided on the inner surface of the paper layer. As a layer having gas barrier properties, layers having at least water vapor barrier properties are often used.

Paper layers usually contain a small amount of moisture inside. Moisture inside the paper layer becomes water vapor when heat is applied during molding of a paper container. Water vapor thus generated will escape outside if a vapor deposition layer is not provided on the outer surface of the paper layer. Accordingly, this may not be a problem.

However, when a water vapor barrier layer is provided on the inner surface of the paper layer and a vapor deposition layer or an aluminum foil layer is disposed on the outer surface, water vapor generated inside the paper layer fails to escape, which may cause bubbles.

This phenomenon is known as bubbling. The bubbling impairs an outer appearance of the paper container as well as preservation properties as a container.

The present invention has been made to address and better solve the aforementioned problem, and is directed to provide a laminate sheet for a packaging container having a highly metallic glossy surface and better reducing occurrence of bubbling in its production process, and a packaging container sleeve using the same.

Solution to Problem

In order to better improve or solve the above problem, one aspect of the present invention is a laminate sheet for use with production of a packaging container having a top and a bottom which are each formed by folding and heat sealing a region including an each end portion of a tubular body, which are formed by overlapping and heat sealing two side edges of a sheet material, the laminate sheet comprising: a top seal section, which is a region corresponding to the top; a bottom seal section, which is a region corresponding to the bottom; and a side face section, which is a region sandwiched by the top seal section and the bottom seal section, the laminate sheet including: an inner layer film which includes a water vapor barrier layer and a sealant layer; a paper substrate; and a thermoplastic resin layer, in sequence from inside the packaging container, wherein a glossy layer is disposed between the paper substrate and the thermoplastic resin layer except for at least part of a region included in the top seal section or the bottom seal section. Another aspect of the present invention is a packaging container sleeve formed by heat sealing to each other two side edges of the above laminate sheet.

[Desired Advantageous Effects of Invention]

The paper container for liquids according to the present invention has higher preservation properties since it has a water vapor barrier layer disposed on the inner surface of a paper substrate. Further, a glossy layer is disposed on the outer surface of the paper substrate to thereby exhibit highly lustrous metallic gloss. Moreover, a glossy layer is disposed on all or part of a seal section, which better prevents occurrence of bubbling in the production process.

DETAILED DESCRIPTION

Description of Representative Embodiments

Embodiments of the present invention will be described with reference to the accompanying drawings. It is to be understood that the present invention is not limited to the following embodiments, which are intended to be representative of the present invention. The representative embodiments described below are merely examples of the present invention, and the design thereof could be appropriately changed by one skilled in the art.

First Embodiment

Figure 1:
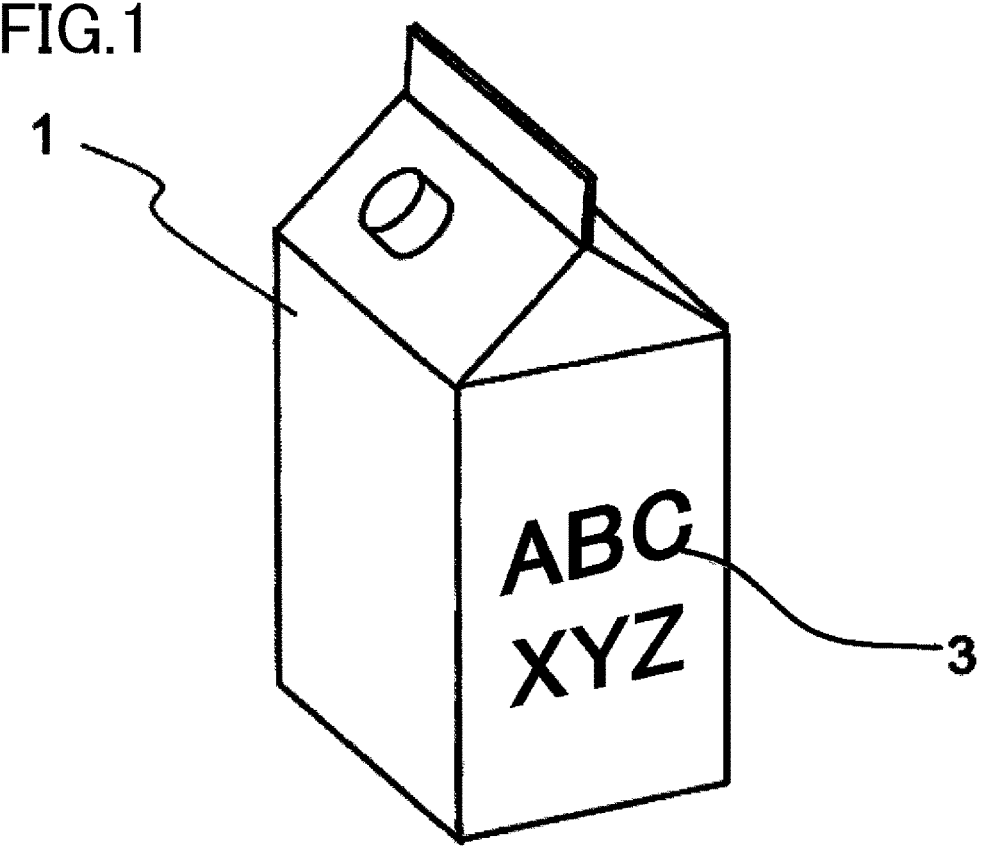
FIG. 1 is a perspective view of a paper container for liquids according to an embodiment of the present invention.

FIG. 1 is a perspective view of an embodiment of a paper container 1 for liquids, which is a packaging container according to the present embodiment. In the example shown in FIG. 1, the paper container 1 for liquids is a gable-top paper container, having a gable-shaped top and a flat bottom, with a spout. The packaging container of the present invention is not limited to this shape, and may be a block shape, a cylindrical paper can shape, a cup shape, and the like.

Figure 2:
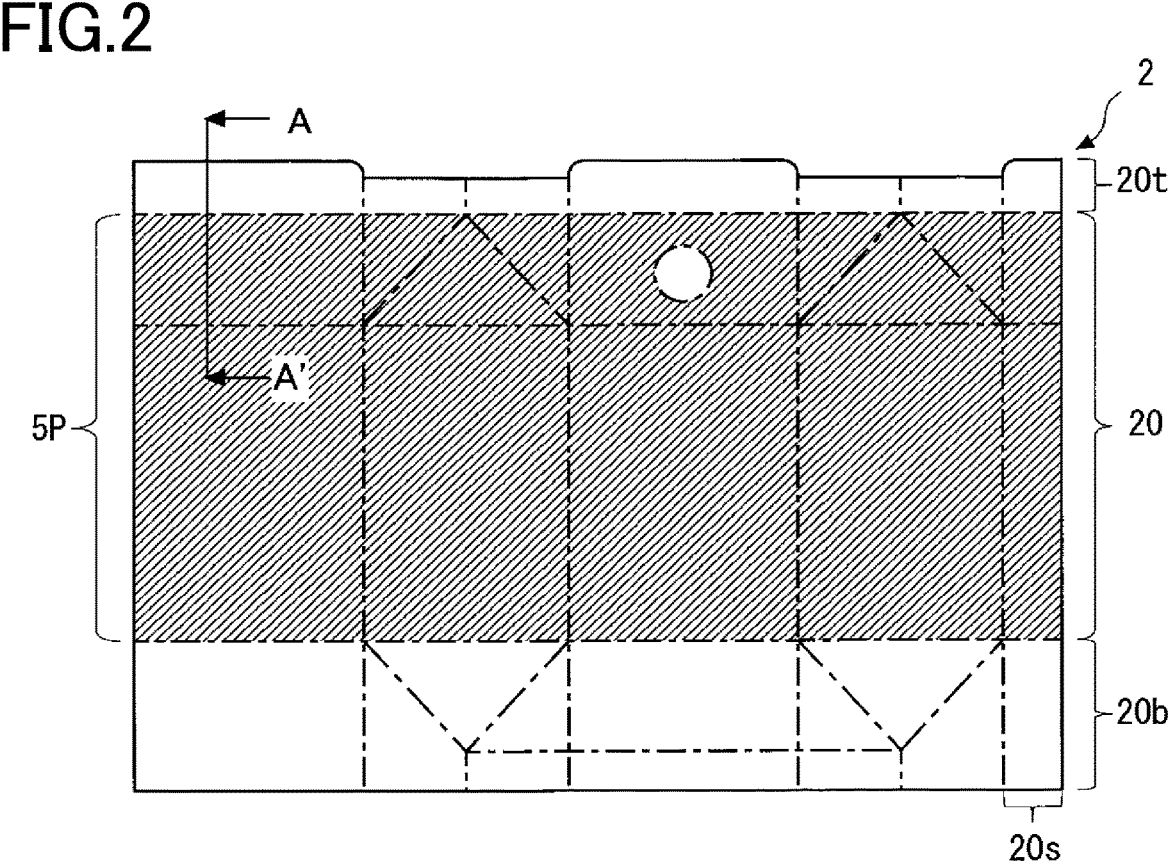
FIG. 2 is a plan view of a laminate sheet according to an embodiment of the present invention.

FIG. 2 is a plan explanatory view which illustrates an embodiment of a punched laminate sheet 2 that forms the paper container 1 for liquids. The hatched area in FIG. 2 indicates a region 5P containing a glossy layer 5, which is described later. In the embodiment shown in FIG. 2, the laminate sheet 2 includes a top seal section 20t that forms a gable-shaped top, a bottom seal section 20b that forms a flat bottom, and a side surface 20 that forms the other portion of the paper container 1 for liquids. In this laminate sheet 2, the glossy layer 5 is not present on the top seal section 20t and the bottom seal section 20b.

In the laminate sheet 2 shown in FIG. 2, the glossy layer 5 is disposed on the side seal section 20s, which is one of the outer edges of the side surface 20, except for portions overlapping with the top seal section 20t and the bottom seal section 20b. In the side seal section, only two laminate sheets are overlapped in heat sealing. Further, heat and pressure are simultaneously applied by using a hot plate during heat sealing. Accordingly, bubbling is not likely to occur even if a glossy layer, which has a low water vapor transmission rate, is present on the side seal.

On the other hand, in the top seal section 20t, pre-heating is performed by blowing hot air, and up to 5 laminate sheets are overlapped in heat sealing. Furthermore, in the bottom seal section 20b, pre-heating is performed by blowing hot air, and then up to 8 laminate sheets are overlapped. Accordingly, in heat sealing of the top seal section 20t and the bottom seal section 20b, bubbling is more likely to occur if the glossy layer 5, which has a low water vapor transmission rate, is present on the seal section since the conditions such as temperature and time for the pre-heating by hot air are severe and pressure is not simultaneously applied with pre-heating. In the bottom seal section, in which a large number of laminate sheets are overlapped and thus bubbling is likely to occur, bubbling will be better prevented if a glossy layer is not present.

In the paper container for liquids according to the present embodiment, since the glossy layer 5 is not present in all or part of the seal section, occurrence of bubbling in the seal section is better prevented.

Figure 3:
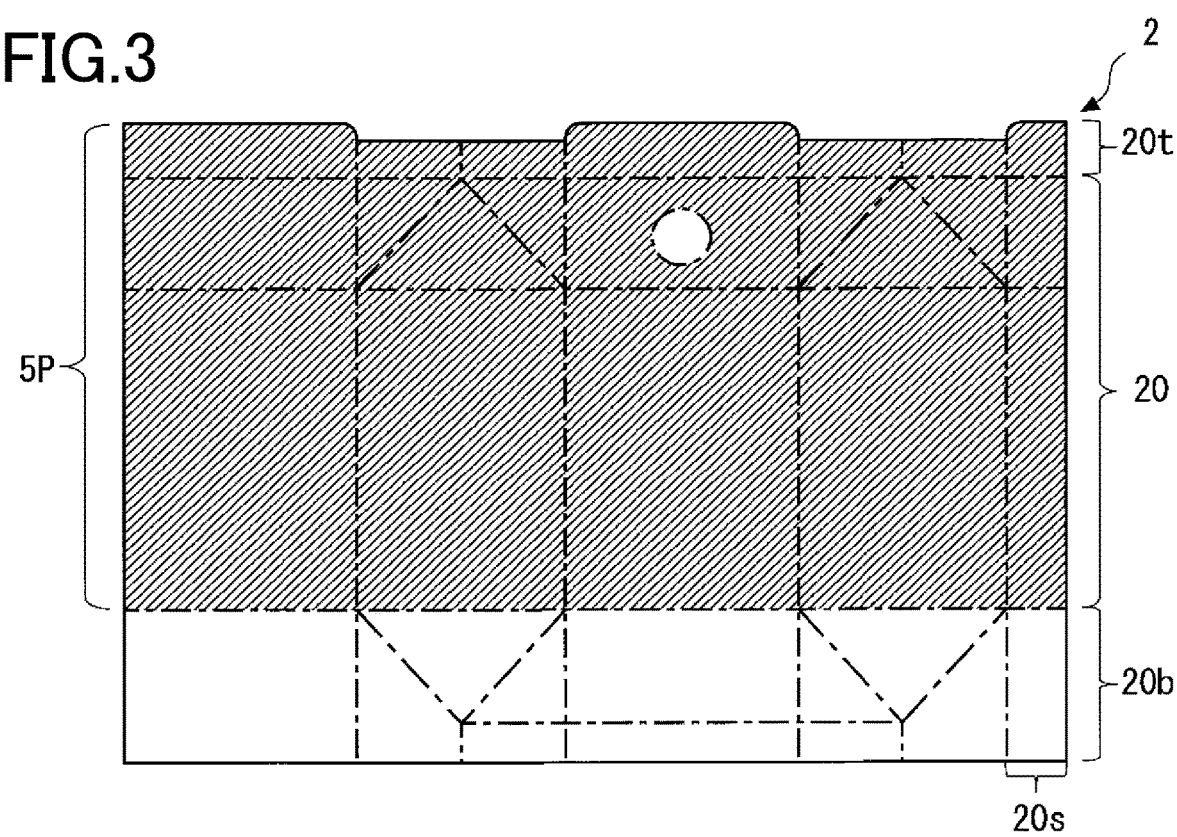
FIG. 3 is a plan view of a laminate sheet according to an embodiment of the present invention.

In the gable-top paper container for liquids having a gable-shaped top and a flat bottom as shown in FIG. 1, the portion where the glossy layer 5 is not present may be the top seal section 20t and the bottom seal section 20b as shown in FIG. 2, or alternatively, only the bottom seal section 20b as shown in FIG. 3.

Figure 4:
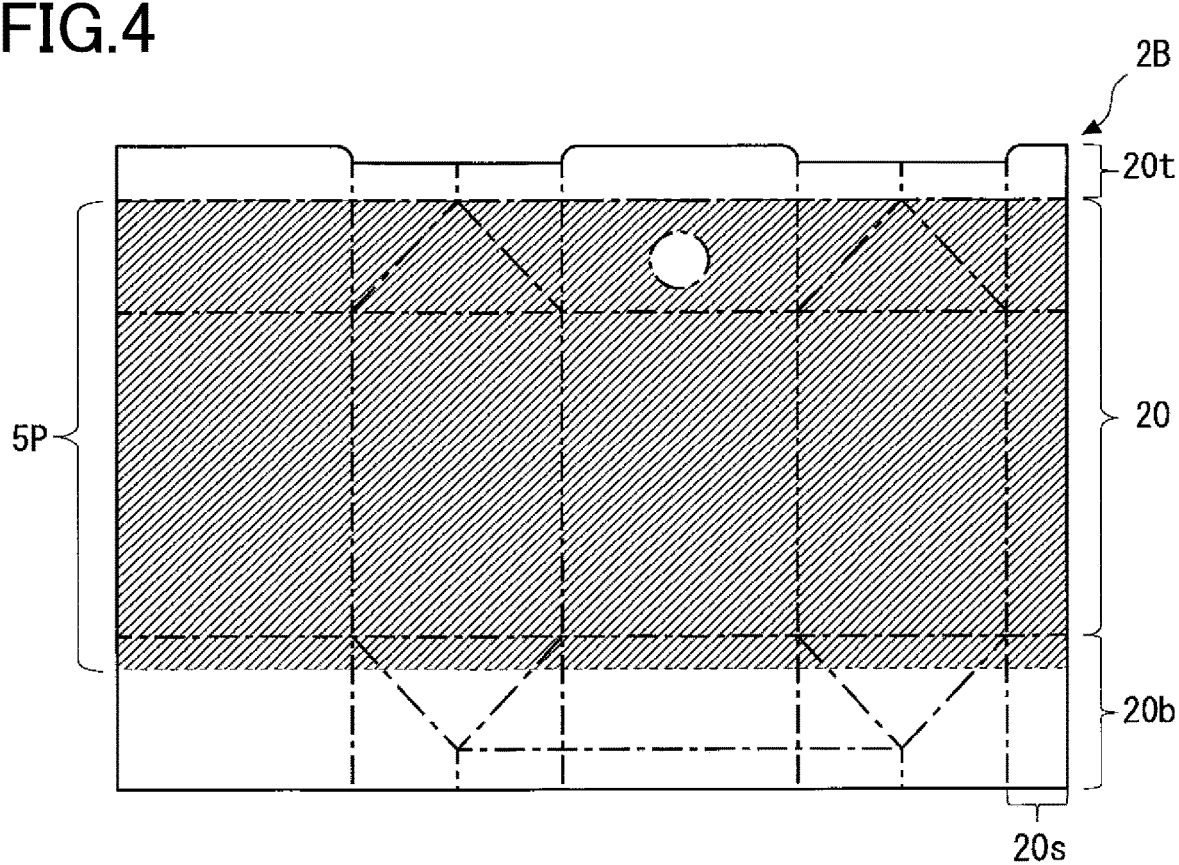
FIG. 4 is a plan view of a laminate sheet according to an embodiment of the present invention.
Figure 5:
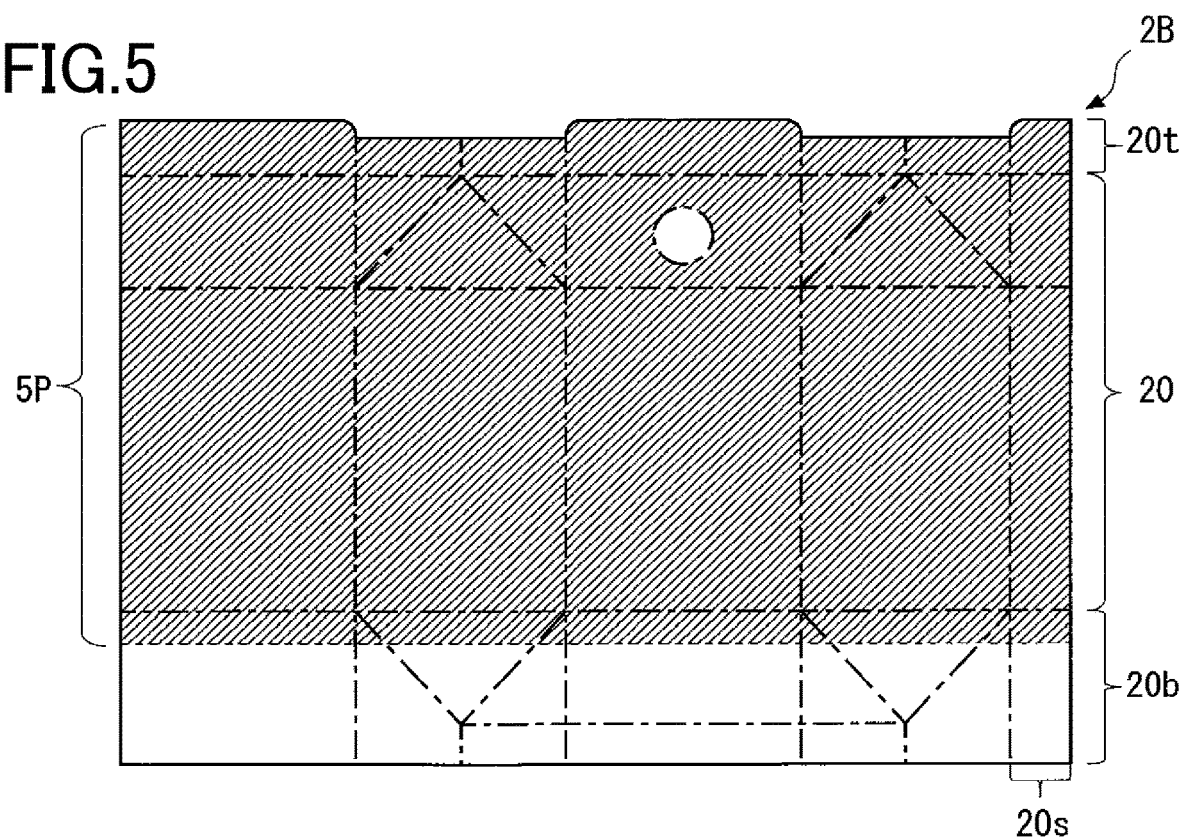
FIG. 5 is a plan view of a laminate sheet according to an embodiment of the present invention.

Alternatively, the glossy layer 5 may be partially disposed on the bottom seal section 20b. For example, as shown in FIGS. 4 and 5, the glossy layer 5 may be disposed in the bottom seal section 20b in an area within a predetermined distance from a boundary edge with the side surface 20, and may not be disposed in an area further than the predetermined distance from the boundary edge. Accordingly, a portion of the bottom which is connected to the lower end of the main body and slightly visible when viewed from the side of the paper container 1 for liquids has the same gloss as that of the main body, which makes an impression that the gloss is continuous from the lower end of the main body to the bottom. Thus, the paper container 1 for liquids may be provided with high designability.

The portion where the glossy layer 5 is not present may be decided depending on the shapes or sizes of the paper container, materials or water vapor transmission rate of the glossy layer 5, thickness or heat transmissivity of the laminate sheet, sealing conditions of the seal section, or the like. For example, the glossy layer 5 may not be disposed, for example, in a portion where bubbling is most likely to occur in an area to be heat sealed.

Examples of the technique of not providing the glossy layer 5 in a predetermined portion of the laminate sheet 2 include reducing the sheet width of the glossy layer 5 in the bonding step, and arranging a plurality of sheets of the glossy layer which are cut into a predetermined width.

Figure 6:
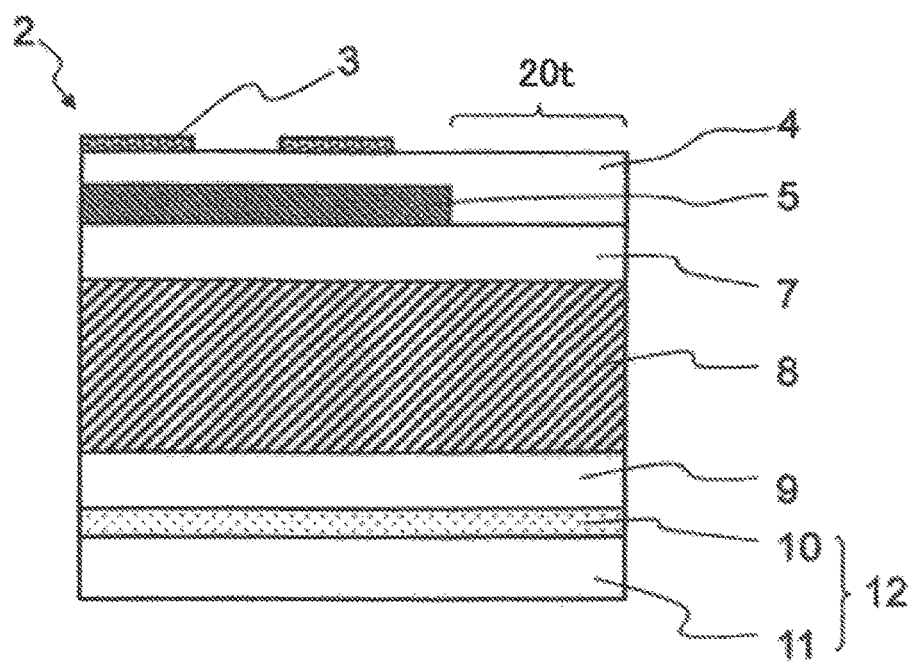
FIG. 6 is a cross-sectional explanatory view which illustrates a cross-section of a laminate sheet according to an embodiment of the present invention taken along the line A-A' in FIG. 2.

FIG. 6 is a cross-sectional explanatory view of the laminate sheet 2, which illustrates a cross-section taken along the line A-A' in FIG. 2. The laminate sheet 2 is formed of an inner layer film 12 having a water vapor barrier layer 10 and a sealant layer 11, a paper substrate 8, and a glossy layer 5, which are laminated, in this embodiment, by using adhesive resins 7 and 9, with a thermoplastic resin layer 4 and a print design layer 3 disposed on the outer layer.

In this example, the glossy layer 5 is not present in the portion corresponding to the top seal section 20*t*. Further, although not shown in FIG. 6, the glossy layer 5 is not present in the portion corresponding to the bottom seal section 20*b*.

As the glossy layer 5, various sheets having a metallic gloss or luster by light interference, including metal foils such as aluminum foils, metal vapor deposition films such as aluminum vapor deposition films, or hologram foils can be used.

In the embodiment shown in FIG. 6, the print design layer 3 is disposed on the thermoplastic resin layer 4. Alternatively, the print design layer 3 may be disposed under the thermoplastic resin layer 4.

As the paper substrate 8, a paper package raw sheet is typically used. Preferably, 100% virgin pulp with a grammage of approximately 250 to 450 g/m² is used in view of paper strength and hygiene perspective. Alternatively, a thick paper usually used for a paper box may be used.

The water vapor barrier layer 10 is preferably made of an aluminum foil, an ethylene vinyl alcohol copolymer layer, a polyvinylidene chloride film, a polyvinylidene chloride coat film, a Nylon film, a polyethylene terephthalate resin film, or a gas barrier film formed by depositing an inorganic substance such as silicon dioxide, an aluminum oxide or the like on the surface of a polyethylene terephthalate resin (PET) film. Examples of the inorganic substance used for a gas barrier film include oxides of silicon, aluminum, magnesium, titanium, zirconium, tin and the like. In particular, aluminum oxide, silicon oxide, magnesium oxide, and the like are preferably used.

When an aluminum foil is used as the water vapor barrier layer 10, sufficient gas barrier properties as well as sufficient light shielding properties can be obtained. Accordingly, excellent long-term preservation properties are achieved. However, the container along with the contents cannot be heated in a microwave oven.

On the other hand, when a gas barrier film containing a metal oxide vapor deposition layer is used as the water vapor barrier layer 10, and a metal foil such as an aluminum foil is not used as the glossy layer 5, the container along with the contents can be heated in a microwave oven.

As the sealant layer 11, a polyolefin-based resin is typically used. Specifically, ethylene-based resin such as low density polyethylene, medium density polyethylene, linear low density polyethylene, ethylene-vinyl acetate copolymer, or ethylene-α olefin copolymer, or a polypropylene-based resin such as homo polypropylene, propylene-ethylene random copolymer, propylene-ethylene block copolymer, or propylene-α olefin copolymer are used.

Figure 7:
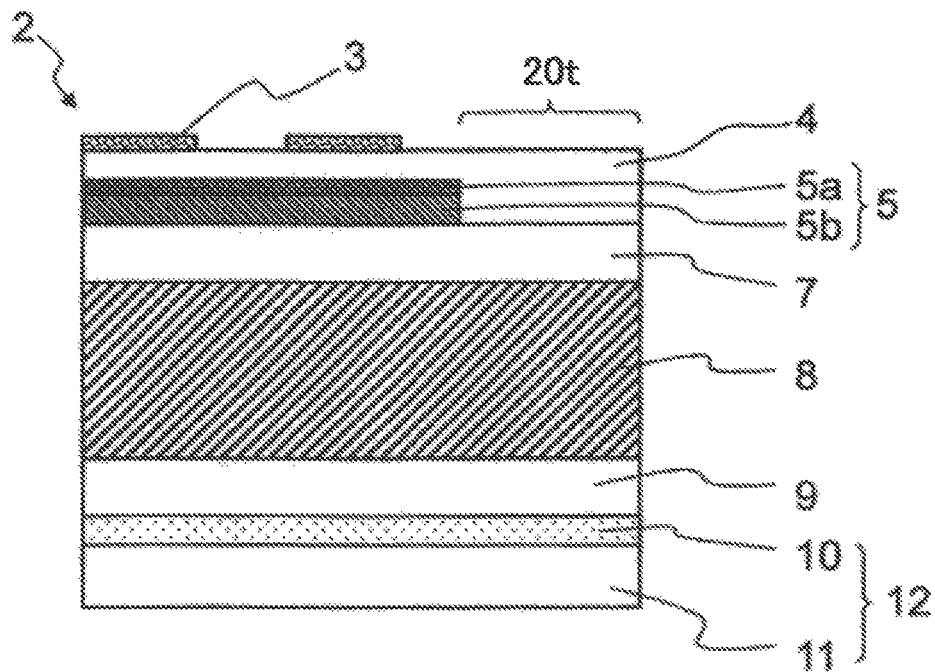
FIG. 7 is a cross-sectional explanatory view of a laminate sheet according to an embodiment of the present invention.

FIG. 7 is a cross-sectional explanatory view which illustrates another embodiment of the laminate sheet 2. In this embodiment, the glossy layer 5 is a vapor deposition film formed by depositing the vapor deposition layer 5*a* on the vapor deposition substrate 5*b*, and the glossy layer 5 is not present on all or part of the seal section.

As a film for a vapor deposition substrate, a polyethylene terephthalate resin (PET) film, polypropylene resin (PP) film, or the like is commonly used. If a paper sheet is used, a thin paper having a vapor deposition anchor layer or the like is used.

As for the vapor deposition substrate 5*b*, if it is made of a film, a PET film or a PP film having a thickness of 4 μm or more and 25 μm or less is most commonly used. As the vapor deposition layer 5*a* disposed on the surface of the vapor deposition substrate 5*b*, an aluminum vapor deposition layer is most commonly used, but any other material may be used. For example, an iris foil having a plurality of metal oxide layers, or a hologram foil having fine irregularities on the surface or the like may be used.

A vapor deposition anchor coat layer may be disposed on the surface of the substrate film 5*b* before formation of the vapor deposition layer 5*a*. This allows the vapor deposition layer to have an improved metallic gloss, and enhances adhesiveness of the vapor deposition layer to the film. When the vapor deposition substrate 5*b* is made of paper, a vapor deposition anchor coat layer, which is not shown in the figure, is preferably used.

In the embodiment shown in FIG. 7, the vapor deposition layer 5*a* is formed on the top of the vapor deposition substrate 5*b*, that is, on the outer surface of the paper container. However, when the vapor deposition substrate 5*b* is a transparent film, the vapor deposition layer 5*a* may be disposed on the underside of the vapor deposition substrate 5*b*, that is, on the inner surface of the paper container.

Figure 8:
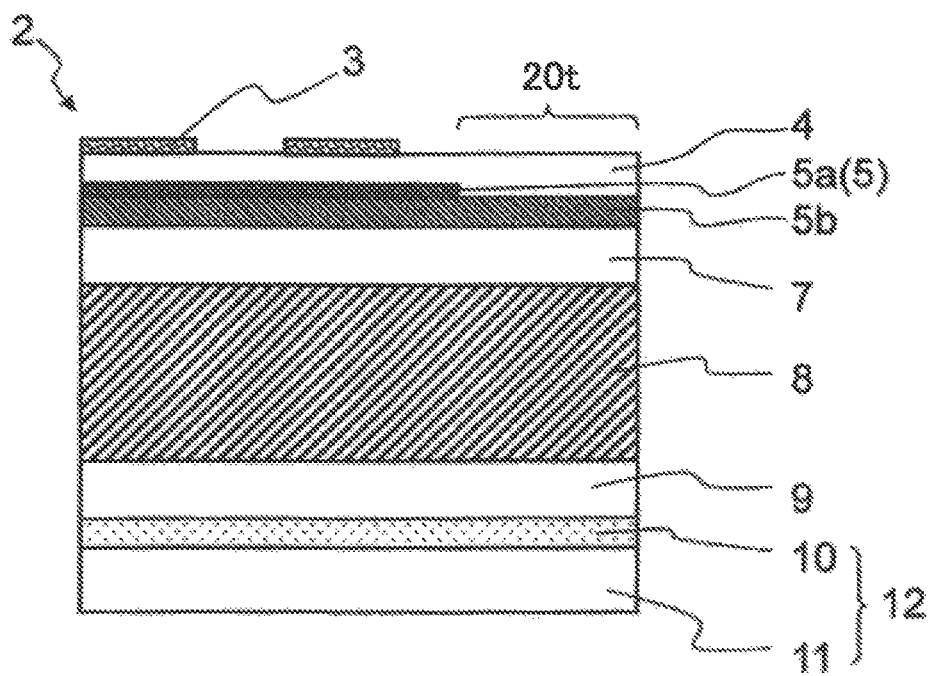
FIG. 8 is a cross-sectional explanatory view which illustrates a cross-section of a laminate sheet according to an embodiment of the present invention taken along the line A-A' in FIG. 2.

FIG. 8 is a cross-sectional explanatory view which illustrates another embodiment of the laminate sheet 2. In this embodiment, the glossy layer 5 is the vapor deposition layer 5*a* formed on the surface of the vapor deposition substrate 5*b*.

In the embodiment shown in FIG. 8, the vapor deposition substrate 5*b* is present in the seal section, while the vapor deposition layer 5*a* as the glossy layer 5 is not present. In general, the thickness of the vapor deposition layer 5*a* is extremely thin. Accordingly, in this configuration, thickness variation of the laminate sheet 2 in the width direction is insignificantly small, which facilitates a bonding step.

The vapor deposition layer 5*a* may be partially absent by using a technique such as placing a mask plate at a target position in a vapor deposition step to better prevent vapor deposition from occurring, or removing a predetermined part of the vapor deposition layer from the vapor deposition layer which has been formed on the entire surface.

For these techniques, a generally known method for forming a partial vapor deposition film may be used.

Next, a step of bonding the layers described above as the laminate sheet 2 will be described. In the example shown in FIG. 6, a resin which is a constituent of the sealant layer 11 is first extruded from an extruder, and is integrated with a sheet of the water vapor barrier layer 10 to form the inner layer film 12.

Then, a thermoplastic resin such as a polyethylene resin or polypropylene resin is extruded from another extruder onto the surface of the glossy layer 5, which has been cut into a narrow width, to thereby form the thermoplastic resin layer 4. The thermoplastic resin layer 4 has a width larger than that of the glossy layer 5. Then, the print design layer 3 is formed on the surface of the thermoplastic resin layer 4 while aligning its position with a bonding position of the glossy layer 5.

Then, the adhesive resin layers 7 and 9 are extruded from another extruder to bond the printed sheet including the glossy layer 5, the paper substrate 8, and the inner layer film 12 which has been previously formed to each other. As the adhesive resin used, a resin for polysand can be used. Specifically, a low density polyethylene resin to which EMAA (ethylene-methacrylic acid copolymer), EAA (ethylene-acrylic acid copolymer), or the like is added is preferably used.

The laminate thus obtained is punched out into a predetermined blank shape to thereby obtain the laminate sheet 2 shown in FIG. 2. The laminate sheet 2 is folded along the dotted line to form a tubular shape, and both end portions of the side surface 20 (end portion in the side seal section 20*s* and an end portion on the opposite side) are overlapped, followed by heat-sealing of the overlapped part by using a hot plate to form a packaging container sleeve. Further, the top seal section 20*t* and the bottom seal section 20*b* of the packaging container sleeve are heated by a hot air blower, and glue flaps, which are the end portions, are overlapped and sealed to each other to thereby form the paper container 1 for liquids, which is a packaging container.

In heating the glue flap, moisture in the paper substrate 8 is evaporated and generates water vapor. Since the water vapor barrier layer 10 is present on the inner surface of the paper container, water vapor generated from the paper substrate cannot penetrate therethrough.

On the other hand, since water vapor is likely to penetrate through the outer surface of the seal section on which the glossy layer 5 is not present, bubbling is less likely to occur in this area. Further, according to the configuration in which a sheet containing an aluminum foil or a vapor deposition sheet may not be disposed on all or part of the seal section, usage of these expensive sheets can be reduced and thus the cost can be reduced. Further, in the configuration in which the glossy layer is a vapor deposition layer which is disposed on the vapor deposition substrate, and a vapor deposition layer is not present in all or part of the seal section, a known bonding step can be used, which facilitates manufacturing.

Second Embodiment

A packaging container of the present embodiment has the same shape as the first embodiment.

Figure 9:
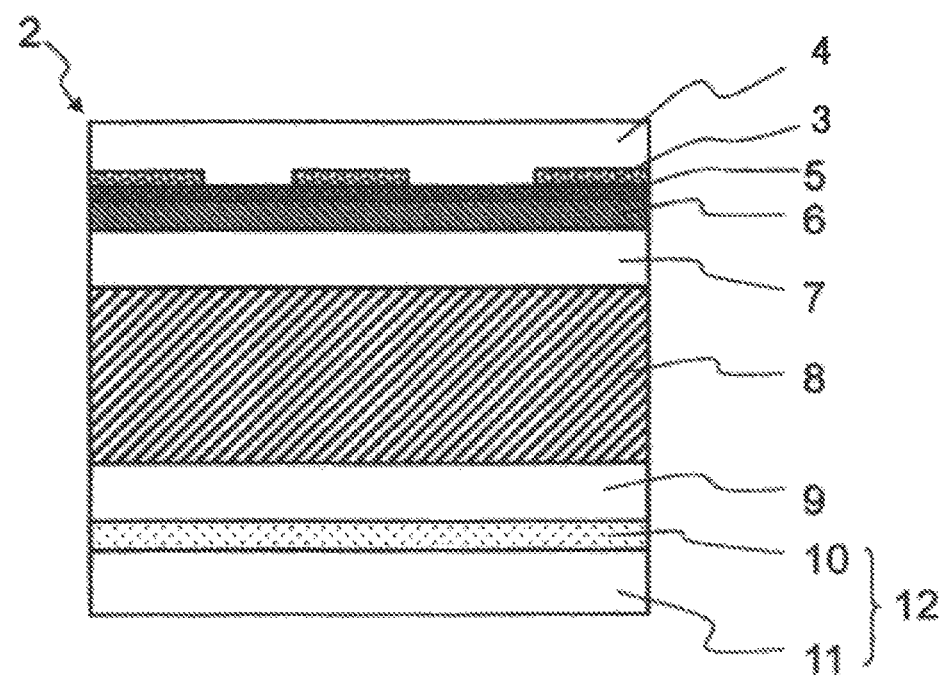
FIG. 9 is a cross-sectional explanatory view of a laminate sheet according to an embodiment of the present invention.

FIG. 9 is a cross-sectional explanatory view of the laminate sheet 2 for a packaging container according to the present embodiment. The laminate sheet 2 is formed of an inner layer film 12 having a water vapor barrier layer 10 and a sealant layer 11, a paper substrate 8, and a film 6 having a surface made of a metal vapor deposition layer 5 with a thickness of 10 nm or more and 90 nm or less, which are laminated by using adhesive resins 7 and 9, with a thermoplastic resin layer 4 disposed on the outer layer.

In the embodiment shown in FIG. 9, the print design layer 3 is disposed under the thermoplastic resin layer 4. Alternatively, the print design layer 3 may be disposed on the thermoplastic resin layer 4.

Materials for the paper substrate 8, the water vapor barrier layer 10 and the sealant layer 11 are the same as the first embodiment. When a gas barrier film containing a metal oxide vapor deposition layer is used as the water vapor barrier layer 10, the container along with the contents can be heated in a microwave oven.

Next, the film 6 having the metal vapor deposition layer 5 on the surface thereof will be described. As the film 6 which serves as the substrate, a PET film having a thickness of 4 μm or more and 12 μm or less is most commonly used. As the metal vapor deposition layer 5 disposed on the surface of the vapor deposition substrate 5*b*, an aluminum vapor deposition layer is most commonly used. A vapor deposition anchor coat layer may optionally be disposed on the surface of the film 6 before formation of the aluminum vapor deposition layer. This allows the aluminum vapor deposition layer to have improved metallic gloss, and enhances adhesiveness of the aluminum vapor deposition layer to the film. In the present embodiment, the film 6 and the metal vapor deposition layer 5 may be on the entire surface of the laminate sheet 2 as the region 5P shown in FIG. 14.

Figure 10:
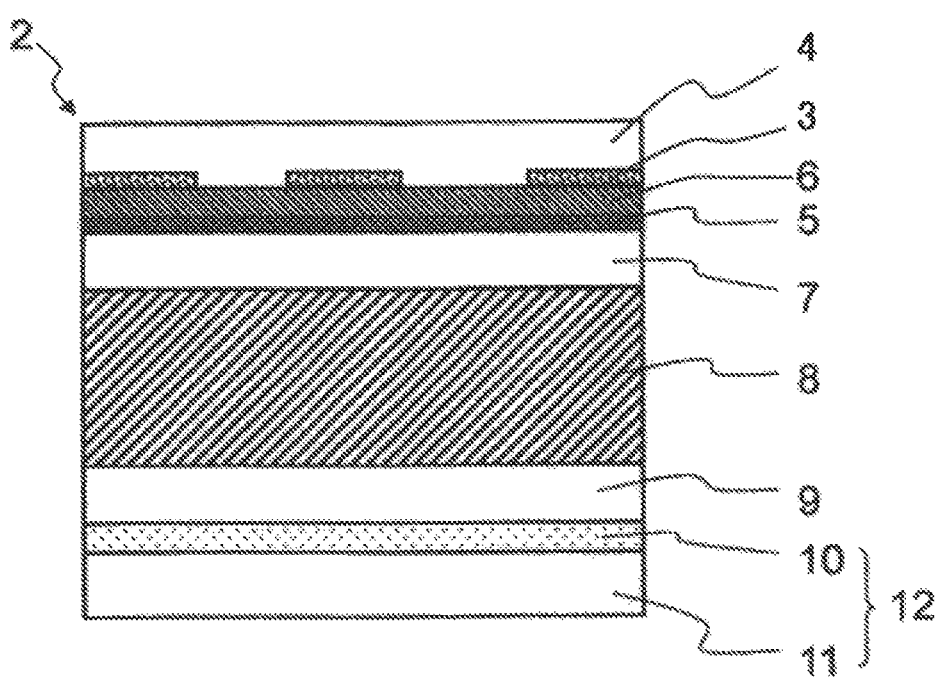
FIG. 10 is a cross-sectional explanatory view of a laminate sheet according to an embodiment of the present invention.

In the embodiment shown in FIG. 9, the metal vapor deposition layer 5 is formed on the top of the film 6, that is, on the outer surface of the paper container. However, the metal vapor deposition layer 5 may be disposed on the underside of the film 6, that is, on the inner surface of the paper container as another example shown in FIG. 10.

Next, a step of bonding the layers described above as the laminate sheet 2 will be described. The lamination method is not specifically limited. As an example, a resin which is a constituent of the sealant layer 11 is first extruded from an extruder, and is integrated with a sheet of the water vapor barrier layer 10 to form the inner layer film 12. Then, the adhesive resin layer 7 is extruded from another extruder to bond the paper substrate 8 and the film 6 having the metal vapor deposition layer 5 on the surface thereof. As the adhesive resin used, a resin for polysand can be used. Specifically, a low density polyethylene resin to which EMAA (ethylene-methacrylic acid copolymer), EAA (ethylene-acrylic acid copolymer), or the like is added is preferably used. Then, the adhesive resin layer 9 is extruded from an extruder in the same manner as described above to bond a laminate of the paper substrate 8 and the film 6 having the metal vapor deposition layer 5 thereof and the inner layer film 12 to thereby form an integrated laminate sheet 2. At this time, a thermoplastic resin such as a polyethylene resin or polypropylene resin can be extruded onto the surface of the film 6 to form the thermoplastic resin layer 4.

The print design layer 3 can be formed in advance after the metal vapor deposition layer 5 is disposed on the film 6 so that the paper container can display necessary information and exhibit high designability.

Thus, a packaging container sleeve and the paper container 1 for liquids are formed in the same manner as the first embodiment by using the laminate sheet 2 obtained as described above.

In heating a glue flap, moisture in the paper substrate 8 is evaporated to generate water vapor. Since the water vapor barrier layer 10 is present on the inner surface of the paper container, water vapor generated from the paper substrate 8 cannot penetrate.

On the other hand, the film 6 having the metal vapor deposition layer 5 is present on the outer surface of the paper container. When the metal vapor deposition layer 5 has a thickness of more than 90 nm, the water vapor transmission rate decreases, which causes water vapor generated from the paper substrate layer to fail to escape, leading to generation of bubbles.

The water vapor transmission rate increases with decrease in thickness of the metal vapor deposition layer 5. However, when the thickness is less than 10 nm, a metallic gloss for sufficient designability cannot be obtained.

Therefore, the thickness of the metal vapor deposition layer 5 is preferably in the range of 10 nm or more and 90 nm or less.

Third Embodiment

A packaging container of the present embodiment has the same shape as the first embodiment.

Figure 11:
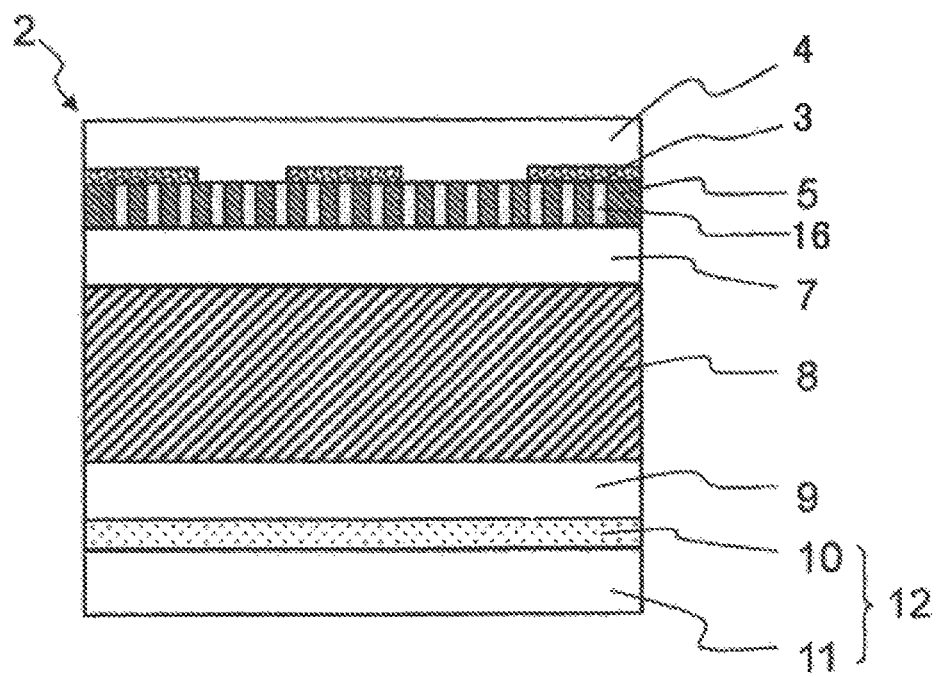
FIG. 11 is a cross-sectional explanatory view of a laminate sheet according to an embodiment of the present invention.

FIG. 11 is a cross-sectional explanatory view of the laminate sheet 2 for a packaging container according to the present embodiment. The laminate sheet 2 is formed of an inner layer film 12 having a water vapor barrier layer 10 and a sealant layer 11, a paper substrate 8, and a glossy layer 5 having the score line 16 penetrating between both surfaces thereof, which are laminated by using adhesive resins 7 and 9, with a thermoplastic resin layer 4 disposed on the outer layer.

As the glossy layer 5, vapor deposition layers having a metallic gloss or luster by light interference, including aluminum foils, aluminum vapor deposition films, or hologram foils can be used. In the present embodiment, the film 6 and the metal vapor deposition layer 5 may be on the entire surface of the laminate sheet 2 as the region 5P shown in FIG. 14.

Although the method for creating the score line 16 penetrating between both surfaces of the glossy layer 5 is not specifically shown in the drawings, physical perforation using a roller cutter or a roller needle, laser perforation, and the like can be used. In this case, perforations can be created as a design by devising the shapes and arrangements of perforations.

In the embodiment shown in FIG. 11, the print design layer 3 is disposed under the thermoplastic resin layer 4. Alternatively, the print design layer 3 may be disposed on the thermoplastic resin layer 4.

Materials for the paper substrate 8, the water vapor barrier layer 10 and the sealant layer 11 are the same as the first embodiment.

When a gas barrier film containing a metal oxide vapor deposition layer is used as the water vapor barrier layer 10, and a metal foil such as an aluminum foil is not used as the glossy layer 5, the container along with the contents can be heated in a microwave oven.

Figure 12:
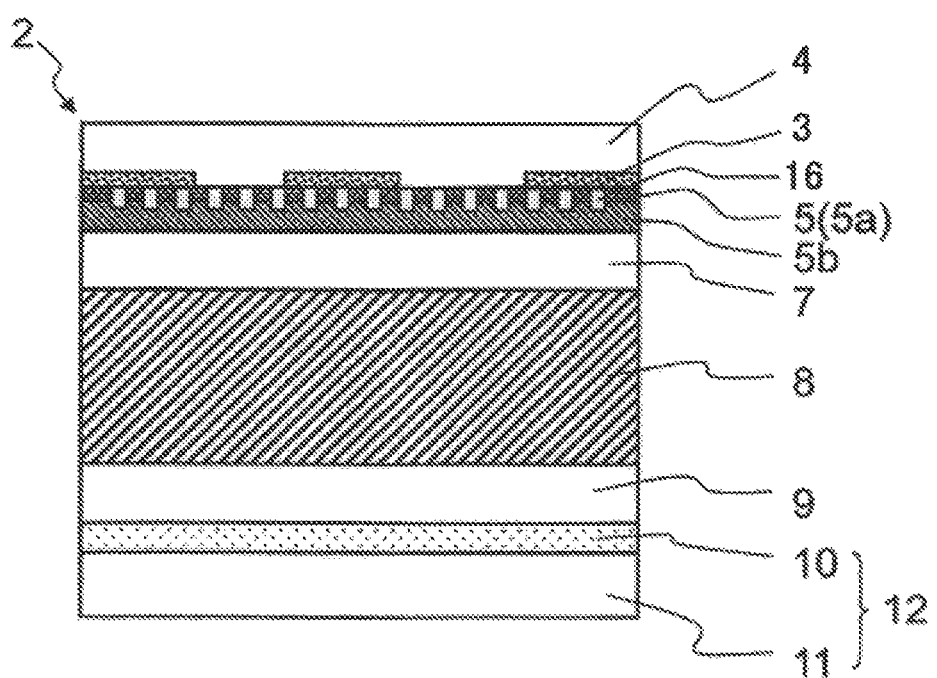
FIG. 12 is a cross-sectional explanatory view of a laminate sheet according to an embodiment of the present invention.

FIG. 12 is a cross-sectional explanatory view which illustrates another embodiment of the laminate sheet 2. In this embodiment, the glossy layer 5 having water vapor transmissivity is the metallic glossy vapor deposition layer 5a deposited on the substrate film 5b, and characterized in that it has the score line 16 penetrating the vapor deposition layer 5a.

When the glossy layer 5 is a vapor deposition layer, it requires the vapor deposition substrate 5b made of a film, paper, or any other material. As a film for a vapor deposition substrate, a polyethylene terephthalate resin (PET) film, polypropylene resin (PP) film, or the like is commonly used. If a paper sheet is used, a thin paper having a vapor deposition anchor layer or the like is used.

The score line 16 created in the vapor deposition layer 5a can improve water vapor transmission rate to thereby reduce occurrence of bubbling in formation process.

The method for creating the score line 16 in the vapor deposition layer 5a is not specifically limited as described above, and may include, for example, forming a score of hairline texture by pressing the vapor deposition layer 5a against a rotating grind roll or creating numerous fine cracks on the vapor deposition layer by compressing the vapor deposition layer 5a between male and female embossing rolls.

In any of these methods, the score line 16 can be created with a small depth and can be easily formed compared with the case of creating a score line across the entire depth of the sheet, which is advantageous in terms of the cost.

The depth of the score line 16 is only required to penetrate the vapor deposition layer 5a, and there is no problem if it reaches the substrate film 5b. When such a glossy layer is provided on a vapor deposition layer deposited on a vapor deposition substrate, it is especially easy to create a score line.

As for the vapor deposition substrate 5b, if it is made of a film, a PET film or a PP film having a thickness of 4 μm or more and 25 μm or less is most commonly used. As the vapor deposition layer 5a disposed on the surface of the vapor deposition substrate 5b, an aluminum vapor deposition layer is most commonly used, but any other material may be used. For example, an iris foil having a plurality of metal oxide layers, or a hologram foil having fine irregularities on the surface or the like may be used.

Similarly to the first embodiment, a vapor deposition anchor coat layer may be disposed on the surface of the substrate film 5b before formation of the vapor deposition layer 5a.

In the embodiment shown in FIG. 12, the vapor deposition layer 5a is formed on the top of the vapor deposition substrate 5b, that is, on the outer surface of the paper container. However, when the vapor deposition substrate 5b is a transparent film, the vapor deposition layer 5a may be disposed on the underside of the vapor deposition substrate 5b, that is, on the inner surface of the paper container.

Figure 13:
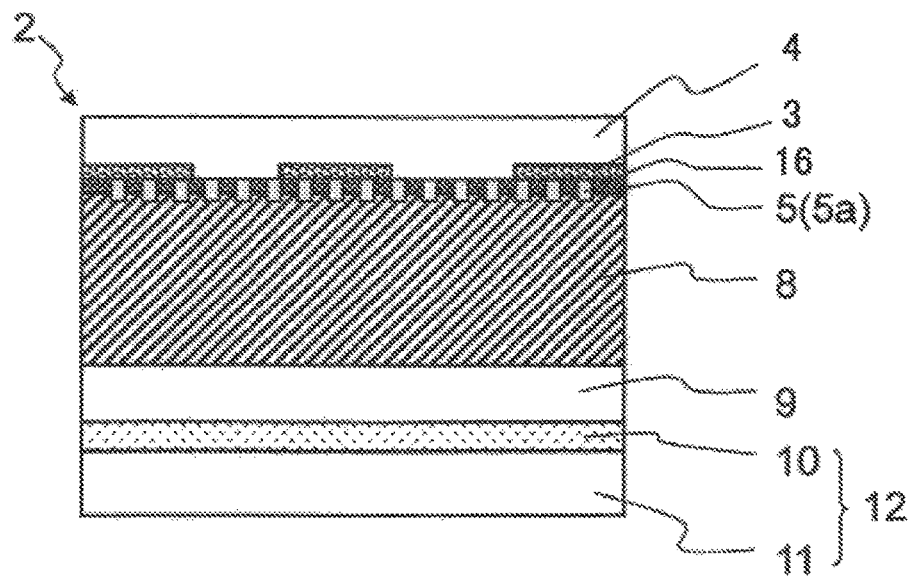
FIG. 13 is a cross-sectional explanatory view of a laminate sheet according to an embodiment of the present invention.

FIG. 13 is a cross-sectional explanatory view which illustrates another embodiment of the laminate sheet 2. In this embodiment, the glossy layer 5 is the vapor deposition layer 5a formed on the surface of the paper substrate 8, which serves as a vapor deposition substrate.

In the embodiment shown in FIG. 13, unlike the paper substrate 8 according to the embodiment shown in FIG. 12, the vapor deposition substrate 5b is not necessary, which simplifies the layer configuration. However, since providing a vapor deposition layer directly on the thick paper is not preferred in terms of the efficiency of the vapor deposition step, a vapor deposition layer is typically formed on a thin film is and transferred to a thick paper via an adhesive or the like.

This technique requires increased cost for materials and processing, and is not suitable for mass production. However, it may be advantageous for small lot production.

Next, a step of bonding the layers described above as the laminate sheet 2 will be described. In the example shown in FIG. 11, a resin which is a constituent of the sealant layer 11 is first extruded from an extruder, and is integrated with a sheet of the water vapor barrier layer 10 to form the inner layer film 12. Then, the adhesive resin layer 7 is extruded from another extruder to bond the paper substrate 8 and the glossy layer 5 having water vapor transmissivity. As the adhesive resin used, a resin for polysand can be used. Specifically, a low density polyethylene resin to which EMAA (ethylene-methacrylic acid copolymer), EAA (ethylene-acrylic acid copolymer), or the like is added is preferably used.

Then, the adhesive resin layer 9 is extruded from an extruder in the same manner as described above to bond a laminate of the paper substrate 8 and the glossy layer 5 and the inner layer film 12 to thereby form an integrated laminate sheet 2. At this time, a thermoplastic resin such as a polyethylene resin or polypropylene resin can be extruded onto the surface of the glossy layer 5 to thereby form the thermoplastic resin layer 4.

The print design layer 3 can be formed in advance on the glossy layer 5 so that the paper container can display necessary information and exhibit high designability.

Thus, a packaging container sleeve and the paper container 1 for liquids are formed in the same manner as the first embodiment by using the laminate sheet 2 obtained as described above.

In heating the glue flap, moisture in the paper substrate 8 is evaporated to generate water vapor. Since the water vapor barrier layer 10 is present on the inner surface of the paper container, water vapor generated from the paper substrate cannot penetrate.

On the other hand, the glossy layer 5 is present on the outer surface of the paper container, exhibiting water vapor transmissivity due to the score line 16. Since the glossy layer 5 has water vapor transmissivity, a risk of occurrence of bubbling can be reduced.

While embodiments of the present invention have been described above, each of the features of these embodiments can be combined as appropriate to more reliably reduce the occurrence of bubbling. For example, in the laminate sheet according to the second and third embodiments, a glossy layer may be partially absent from the seal section as the first embodiment.

EXAMPLES

Laminate sheets and packaging containers using the same according to examples, reference examples, and comparative examples of the first embodiment were produced.

Example 1-1

An aluminum foil with a thickness of 6 μm was used as a water vapor barrier layer. A linear low density polyethylene resin (LLDPE) was extruded from an extruder at a thickness of 60 μm as a sealant layer onto the rear surface of the aluminum foil and integrated therewith to form an inner layer film.

Then, as a glossy layer, a plurality of pieces of vapor deposition film, each formed by depositing an aluminum vapor deposition layer on a PET film with a thickness of 12 μm and being cut into a width corresponding to the glossy layer-containing region 5P (a portion other than the top seal section and the bottom seal section) as shown in FIG. 2, were prepared. A low density polyethylene resin (LDPE) was extruded at a thickness of 18 μm onto a vapor deposition surface of the vapor deposition film to thereby form a thermoplastic resin layer. Further, a print design layer was formed on the surface of the thermoplastic resin layer by using a nitrocellulose urethane-based ink.

An adhesive resin (LDPE to which EMAA and EAA were added) was extruded from an extruder to bond the rear surface (PET surface) of the vapor deposition film and a surface of a thick paper (No-coat ivory) which serves as a paper layer with a grammage of 380 g/m². Then, a laminated paper thus obtained was bonded to the inner layer film previously formed by using the same adhesive resin as above, which was also extruded from an extruder. The vapor deposition films having the aluminum vapor deposition layer with a thickness of 10 nm, 50 nm, 90 nm, and 100 nm were provided. Thus, four types of laminate sheets were produced.

The laminate sheet thus obtained was positioned as shown in FIG. 2, punched out into a predetermined shape, and formed into a paper container for liquids having a shape shown in FIG. 1 with a spout attached. The heat sealing conditions during formation were a temperature of 250° C., pressure of 0.2 MPa, and compression time of 1 second. In the formation process, occurrence of bubbling was not observed. Further, the paper container obtained had an outer appearance that exhibits a highly lustrous metallic gloss in a region containing a glossy layer.

Example 1-2

A paper container for liquids was produced in the same manner as Example 1-1 except that the configuration of the laminate sheet was adjusted by adjusting the width of the glossy layer so that the glossy layer was not provided in the bottom seal section as shown in FIG. 3. In the formation process, occurrence of bubbling was not observed. Further, the paper container obtained had an outer appearance that exhibits a highly lustrous metallic gloss in a region containing a glossy layer.

Example 1-3

A paper container for liquids was produced in the same manner as Example 1-1 except that the configuration of the laminate sheet was adjusted so that the glossy layer 5 was provided in the bottom seal section 6b in an area within 2 cm from a boundary edge with the side surface 6s, and is not disposed in an area further than 2 cm from the boundary edge as shown in FIG. 4. In the formation process, occurrence of bubbling was not observed. Further, the paper container obtained had an outer appearance that exhibits a highly lustrous metallic gloss in a region containing a glossy layer.

Example 1-4

A paper container for liquids was produced in the same manner as Example 1-1 except that an aluminum foil with a thickness of 6 μm lined by a PET film with a thickness of 12 μm was used as a glossy layer. In the formation process, occurrence of bubbling was not observed. Further, the paper container obtained had an outer appearance that exhibits a highly lustrous metallic gloss in a region containing a glossy layer.

Reference Example 1-1

Figure 14:
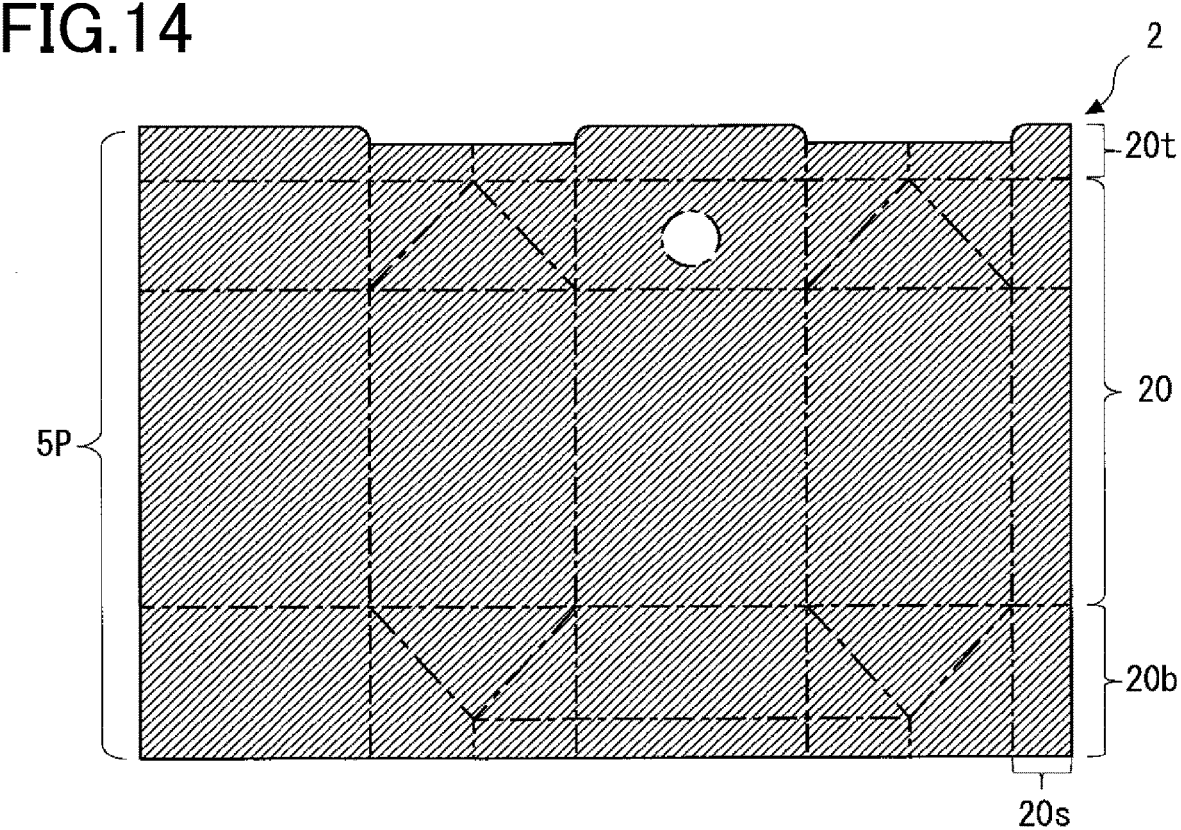
FIG. 14 is a plan explanatory view of a laminate sheet according to an embodiment and a comparative example of the present invention.

A paper container for liquids was produced in the same manner as Example 1-1 except that the configuration of a blank sheet was adjusted by adjusting the width of the glossy layer so that the glossy layer was provided in the seal section as shown in FIG. 14. The paper container obtained had an outer appearance that exhibits a highly lustrous metallic gloss. However, for the aluminum vapor deposition layer with a thickness of 100 nm, occurrence of bubbling was observed in the formation process.

Comparative Example 1-1

A paper container for liquids was produced in the same manner as Example 1-4 except that the configuration of a blank sheet was adjusted by adjusting the width of the glossy layer so that the glossy layer was provided in the seal section as shown in FIG. 14. The paper container obtained had an outer appearance that exhibits highly lustrous metallic gloss. However, occurrence of bubbling was observed in the formation process.

The above results are summarized in Table 1. In the table, "+" for the glossiness represents a highly lustrous metallic gloss, and "+" and "−" for the bubbling resistance represent non-occurrence of bubbling and occurrence of bubbling, respectively.

TABLE 1

|  |  | Glossy layer thickness | | | |
|---|---|---|---|---|---|
|  |  | 10 nm | 50 nm | 90 nm | 100 nm |
| Example 1-1 | Glossiness | + | + | + | + |
|  | Bubbling resistance | + | + | + | + |
| Example 1-2 | Glossiness | + | + | + | + |
|  | Bubbling resistance | + | + | + | + |

TABLE 1-continued

| | | | | | |
|---|---|---|---|---|---|
| Example 1-3 | Glossiness | + | + | + | + |
| | Bubbling resistance | + | + | + | + |
| Reference example 1-1 | Glossiness | + | + | + | + |
| | Bubbling resistance | + | + | + | − |

| | | Glossy layer thickness: 60 μm |
|---|---|---|
| Example 1-4 | Glossiness | + |
| | Bubbling resistance | + |
| Comparative example 1-1 | Glossiness | + |
| | Bubbling resistance | − |

As shown in Table 1, in the paper container for liquids of each example which does not have a glossy layer in all or part of the seal section, an outer appearance for a region containing the glossy layer is provided with a high metallic gloss, as well as good bubbling resistance regardless of the thickness of the glossy layer.

Laminate sheets and packaging containers using the same according to reference examples and comparative examples of the second embodiment were produced.

Reference Example 2-1

As a water vapor barrier layer, a laminated sheet of an aluminum foil having a thickness of 6 μm and a PET film having a thickness of 12 μm as a support layer was used. A linear low density polyethylene resin (LLDPE) was extruded from an extruder at a thickness of 60 μm as a sealant layer onto the PET film surface of the aluminum foil and integrated therewith to form an inner layer film.

Then, a vapor deposition film formed by depositing an aluminum vapor deposition layer having a thickness of 10 nm on a PET film having a thickness of 12 μm was prepared. A print design using YMCK and two spot colors was formed on the vapor deposition surface by a gravure printing machine.

An adhesive resin (LDPE to which EMAA and EAA were added) was extruded from an extruder to bond the rear surface of the vapor deposition film and a surface of a thick paper (No-coat ivory) which serves as a paper layer with a grammage of 380 g/m². Then, a laminated paper thus obtained was bonded to the inner layer film previously formed by using the same adhesive resin as above, which was also extruded from an extruder. Simultaneously, a polyethylene resin was extruded on the surface of the vapor deposition film to thereby form a thermoplastic resin layer.

The laminate sheet thus obtained was punched out into the shape shown in FIG. 14, and formed into a paper container for liquids having a shape shown in FIG. 1 with a spout attached. The heat sealing conditions during formation were the temperature of 250° C., pressure of 0.2 MPa, and compression time of 1 second.

Reference Example 2-2

Reference Example 2-2 was the same as Reference Example 2-1 except that the metal vapor deposition layer of the vapor deposition film had a thickness of 20 nm.

Reference Example 2-3

Reference Example 2-3 was the same as Reference Example 2-1 except that the metal vapor deposition layer of the vapor deposition film had a thickness of 30 nm.

Reference Example 2-4

A paper container for liquids was produced in the same manner as Reference Example 2-1 except that the metal vapor deposition layer of the vapor deposition film had a thickness of 40 nm.

Reference Example 2-5

A paper container for liquids was produced in the same manner as Reference Example 2-1 except that the metal vapor deposition layer of the vapor deposition film had a thickness of 50 nm.

Reference Example 2-6

A paper container for liquids was produced in the same manner as Reference Example 2-1 except that the metal vapor deposition layer of the vapor deposition film had a thickness of 60 nm.

Reference Example 2-7

A paper container for liquids was produced in the same manner as Reference Example 2-1 except that the metal vapor deposition layer of the vapor deposition film had a thickness of 70 nm.

Reference Example 2-8

A paper container for liquids was produced in the same manner as Reference Example 2-1 except that the metal vapor deposition layer of the vapor deposition film had a thickness of 80 nm.

Reference Example 2-9

A paper container for liquids was produced in the same manner as Reference Example 2-1 except that the metal vapor deposition layer of the vapor deposition film had a thickness of 90 nm.

Reference Example 2-10

A paper container for liquids was produced in the same manner as Reference Example 2-4 except that an aluminum vapor deposition film formed by depositing an aluminum vapor deposition layer on a PET film having a thickness of 12 μm was used as the water vapor barrier layer.

In any of Reference Examples 2-1 to 2-10, occurrence of bubbling was not observed in the formation process. Further, the paper container obtained had an outer appearance that exhibits a highly lustrous metallic gloss.

Comparative Example 2-1

A paper container for liquids was produced in the same manner as Reference Example 2-1 except that the metal vapor deposition layer of the vapor deposition film had a thickness of 5 nm. In the formation process, occurrence of bubbling was not observed. However, the outer appearance of the paper container for liquids did not have sufficient metallic glossiness.

Comparative Example 2-2

A paper container for liquids was produced in the same manner as Reference Example 2-1 except that the metal vapor deposition layer of the vapor deposition film had a thickness of 100 nm. The outer appearance of the paper container for liquids had high metallic glossiness. However, occurrence of bubbling was observed in the formation process.

The above results are summarized in Table 2. In the table, "+" and "−" for the glossiness represent presence and absence of highly lustrous metallic gloss, respectively, and "+" and "−" for the bubbling resistance represent non-occurrence and occurrence of bubbling, respectively.

container obtained had an outer appearance that exhibits a highly lustrous metallic gloss.

Reference Example 3-2

An aluminum foil having a thickness of 6 μm in which a perforation penetrating between both surfaces thereof has been formed was used as a glossy layer. A paper container for liquids was produced in the same manner as Reference Example 3-1 except that an LLDPE having a thickness of 25 μm was used as a thermoplastic resin layer on the surface. In the formation process, occurrence of bubbling was not observed. Further, the outer appearance of the paper container obtained had a highly lustrous metallic gloss as well as unique designability due to the perforation processing.

TABLE 2

|  | Comparative Example 2-1 | Reference Example 2-1 | Reference Example 2-2 | Reference Example 2-3 | Reference Example 2-4 | Reference Example 2-5 | Reference Example 2-6 | Reference Example 2-7 | Reference Example 2-8 | Reference Example 2-9 | Reference Example 2-10 | Comparative Example 2-2 |
|---|---|---|---|---|---|---|---|---|---|---|---|---|
| Glossiness | − | + | + | + | + | + | + | + | + | + | + | + |
| Bubbling resistance | + | + | + | + | + | + | + | + | + | + | + | − |

As shown in Table 2, when the metal vapor deposition layer has a thickness in the range of 10 nm or more and 90 nm or less, a paper container for liquids having good bubbling resistance and a high metallic gloss can be obtained.

Laminate sheets and packaging containers using the same according to reference examples and comparative examples of the third embodiment were produced.

Reference Example 3-1

As a water vapor barrier layer, a laminated sheet of an aluminum foil having a thickness of 6 μm and a PET film having a thickness of 12 μm as a support layer was used. A linear low density polyethylene resin (LLDPE) was extruded from an extruder at a thickness of 60 μm as a sealant layer onto the PET film surface of the aluminum foil and integrated therewith to form an inner layer film.

Then, a vapor deposition film formed by depositing an aluminum vapor deposition layer having a thickness of 100 nm on a PET film having a thickness 12 μm was prepared. A score line of a hairline shape penetrating the vapor deposition layer was formed by pressing the vapor deposition surface against a rotating polishing roll. A low density polyethylene resin (LDPE) was extruded at a thickness of 18 μm onto a vapor deposition surface of the vapor deposition film to thereby form a thermoplastic resin layer. Further, a print design layer was formed on the surface of the thermoplastic resin layer by using a nitrocellulose urethane-based ink.

An adhesive resin (LDPE to which EMAA and EAA were added) was extruded from an extruder to bond the rear surface (PET surface) of the vapor deposition film and a surface of a thick paper (No-coat ivory) which serves as a paper layer with a grammage of 380 g/m$^2$. Then, a laminated paper thus obtained was bonded to the inner layer film previously formed by using the same adhesive resin as above, which was also extruded from an extruder.

The laminate sheet thus obtained was punched out into the shape shown in FIG. 14, and formed into a paper container for liquids having a shape shown in FIG. 1 with a spout attached. The heat sealing conditions during formation were the temperature of 250° C., pressure of 0.2 MPa, and compression time of 1 second. In the formation process, occurrence of bubbling was not observed. Further, the paper

Reference Example 3-3

A polypropylene resin (CPP) having a thickness of 20 μm was used as a material for the thermoplastic resin layer on the surface. Further, a vapor deposition paper formed by applying aluminum vapor deposition on a surface of a thin paper having a grammage of 23 g/m$^2$ via a vapor deposition anchor coat layer was used as a glossy layer. In the glossy layer, a perforation penetrating both surfaces thereof was formed. A paper container for liquids was produced in the same manner as Reference Example 3-1 except for these conditions. In the formation process, occurrence of bubbling was not observed. Further, the outer appearance of the paper container obtained had a metallic gloss with a luster specific to the vapor deposition paper as well as unique designability.

Reference Example 3-4

A vapor deposition thick paper with a grammage of 80 g/m$^2$ having a vapor deposition layer on the surface was used as a paper layer. The surface of the vapor deposition layer was embossed to create fine cracks. An LDPE layer having a thickness of 18 μm was formed on the surface of the paper layer. Further, a print design layer was formed also by using a nitrocellulose urethane-based ink. A laminate thus formed was bonded to an inner layer film formed in the same manner as Reference Example 3-1 to thereby form a laminate sheet. A paper container for liquids was produced in the same manner as above. In the formation process, occurrence of bubbling was not observed. Further, the outer appearance of the paper container obtained had a highly lustrous metallic gloss as well as unique designability due to the emboss processing.

Comparative Example 3-1

A paper container for liquids was produced in the same manner as Reference Example 3-1 except that a score line was not formed in the vapor deposition film. The paper container obtained had an outer appearance that exhibits a highly lustrous metallic gloss. However, occurrence of bubbling was observed in the formation process.

The above results are summarized in Table 3. In the table, "+" for the glossiness represents a highly lustrous metallic gloss, and "+" and "−" for the bubbling resistance represent non-occurrence of bubbling and occurrence of bubbling, respectively.

TABLE 3

|  | Reference example 3-1 | Reference example 3-2 | Reference example 3-3 | Reference example 3-4 | Comparative example 3-1 |
|---|---|---|---|---|---|
| Glossiness | + | + | + | + | + |
| Bubbling resistance | + | + | + | + | − |
| Glossiness | + | + | + | + | + |
| Bubbling resistance | + | + | + | + | − |

As shown in Table 3, by virtue of the score line formed in the glossy layer, a paper container for liquids with good bubbling resistance and an outer appearance having a high metallic gloss can be obtained.

INDUSTRIAL APPLICABILITY

The present invention is useful for packaging containers such as paper container for liquids.

REFERENCE SIGNS LIST

1 Paper container for liquids; 2 Laminate sheet; 3 Print design layer; 4 Thermoplastic resin; 5 Glossy layer; 5a Vapor deposition layer; 5b Vapor deposition substrate; 5P Glossy layer-containing region; 7 Adhesive resin layer; 8 Paper substrate; 9 Adhesive resin layer; 10 Water vapor barrier layer; 11 Sealant layer; 12 Inner layer film; 16 Score line; 20 Side surface; 20t Top seal section; 20b Bottom seal section; 20s Side seal section.

What is claimed is:

1. A laminate sheet comprising in a plain view:
    a top seal section;
    a bottom seal section; and
    a side face section, which is a region sandwiched between the top seal section and the bottom seal section,
    the laminate sheet comprises in sequence in a direction perpendicular to the plain view a) an inner layer film which includes a water vapor barrier layer and a sealant layer; b) a paper substrate; and c) a thermoplastic resin layer, the laminate sheer further comprises
    a glossy layer, which is disposed between the paper substrate and the thermoplastic resin layer in the side face section but not in at least a portion of the top seal section or the bottom seal section, wherein the laminate sheet is configured to form a packaging container having a top and a bottom by folding and heat sealing the laminate sheet, such that the inner layer film faces inside of the container and the top and the bottom of the container are formed by overlapping and heat sealing side edges of the top seal section and the bottom seal section, respectively of the laminate sheet without bubbling formation, wherein the glossy layer is a metal vapor deposition layer with a thickness of 10 nm or more and 90 nm or less.

2. The laminate sheet of claim 1, wherein the bottom seal section has the glossy layer disposed in an area within a predetermined distance from a boundary edge with the side face section, and does not have the glossy layer disposed in an area further than the predetermined distance from the boundary edge with the side face.

3. The laminate sheet of claim 1, wherein the glossy layer has a scoring line penetrating both surfaces of the glossy layer.

4. A packaging container sleeve formed by heat sealing to each other two side edges of the laminate sheet of claim 1.

5. The laminate sheet of claim 1, wherein the glossy layer is not disposed in the bottom seal section.

6. The laminate sheet of claim 5, wherein the glossy layer has a scoring line penetrating both surfaces of the glossy layer.

7. The laminate sheet of claim 1, wherein the glossy layer is not disposed in the top seal section.

8. The laminate sheet of claim 7, wherein the glossy layer has a scoring line penetrating both surfaces of the glossy layer.

9. The laminate sheet of claim 1, wherein the glossy layer is not disposed in either of the top seal section or the bottom seal section.

10. The laminate sheet of claim 9, wherein the glossy layer has a scoring line penetrating both surfaces of the glossy layer.

11. A packaging container formed by folding and heat sealing a laminate sheet comprising in a plain view:
    a top seal section;
    a bottom seal section; and
    a side face section, which is a region sandwiched between the top seal section and the bottom seal section,
    the laminate sheet comprises in sequence in a direction perpendicular to the plain view a) an inner layer film which includes a water vapor barrier layer and a sealant layer; b) a paper substrate; and c) a thermoplastic resin layer, the laminate sheer further comprises
    a glossy layer, which is disposed between the paper substrate and the thermoplastic resin layer in the side face section but not in at least a portion of the top seal section or the bottom seal section, wherein the inner layer film faces inside of the container and the top and the bottom of the container are formed by overlapping and heat sealing side edges of the top seal section and the bottom seal section, respectively of the laminate sheet without bubbling formation, wherein the glossy layer is a metal vapor deposition layer with a thickness of 10 nm or more and 90 nm or less.

12. The packaging container of claim 11, wherein the glossy layer is not disposed in the bottom seal section.

13. The packaging container of claim 11, wherein the glossy layer is not disposed in the top seal section.

14. The packaging container of claim 11, wherein the glossy layer is not disposed in either of the top seal section or the bottom seal section.

15. The packaging container of claim 11, wherein the glossy layer has a scoring line penetrating both surfaces of the glossy layer.

\* \* \* \* \*